US008392718B2

(12) United States Patent
Jinkawa et al.

(10) Patent No.: US 8,392,718 B2
(45) Date of Patent: Mar. 5, 2013

(54) PROGRAMMABLE CONTROLLER SYSTEM AND AID DEVICE FOR CONTROL PROGRAM DEVELOPMENT THEREFOR

(75) Inventors: Takeshi Jinkawa, Moriyama (JP); Kenichi Yamazaki, Uozu (JP)

(73) Assignees: OMRON Corporation, Kyoto (JP); YKK Corporation, Toyama (JP)

( * ) Notice: Subject to any disclaimer, the term of this patent is extended or adjusted under 35 U.S.C. 154(b) by 1062 days.

(21) Appl. No.: 11/528,489

(22) Filed: Sep. 27, 2006

(65) Prior Publication Data

US 2007/0079370 A1    Apr. 5, 2007

(30) Foreign Application Priority Data

Sep. 27, 2005 (JP) ................................. 2005-280437
Sep. 21, 2006 (JP) ................................. 2006-256131

(51) Int. Cl.
*G06F 21/00* (2006.01)
(52) U.S. Cl. .............................. 713/183; 726/17; 726/27
(58) Field of Classification Search .................. 713/176, 713/182–186; 340/5.5; 380/282; 726/1–4, 726/16–17, 21, 26–29
See application file for complete search history.

(56) References Cited

U.S. PATENT DOCUMENTS

| 5,326,968 | A |   | 7/1994 | Johnson et al. |         |
|-----------|---|---|--------|----------------|---------|
| 5,867,106 | A | * | 2/1999 | Bi et al. ...................... | 340/5.54 |
| 6,367,020 | B1 | * | 4/2002 | Klein .............................. | 726/26 |
| 7,505,786 | B2 | * | 3/2009 | Wennberg et al. ............ | 455/558 |
| 2002/0029337 | A1 | * | 3/2002 | Sudia et al. ................... | 713/176 |

FOREIGN PATENT DOCUMENTS

| DE | 69414761 | 7/1999 |
| DE | 19859126 | 1/2000 |
| DE | 19924470 | 9/2000 |
| DE | 10135766 | 2/2003 |
| DE | 10139796 | 3/2003 |

OTHER PUBLICATIONS

Patent Abstracts of Japan, Publication No. 2003-162507, *User Authentication System*, Nagasawa Masaru, published Jun.6, 2003, filed Nov. 26, 2001.
DE patent application No. 10-2007-051-574.1-52, Examination Report dated Aug. 27, 2008.

\* cited by examiner

*Primary Examiner* — Kambiz Zand
*Assistant Examiner* — John B King
(74) *Attorney, Agent, or Firm* — Weaver Austin Villeneuve & Sampson LLP

(57) ABSTRACT

A programmable controller system is formed by connecting a personal computer having an aid device program module installed to serve as an aid device for development of control program to a programmable controller having password protect function. A hardware key storing a specified password code is detachably attached to the personal computer. The aid device program module checks whether or not software module with a function of certifying a hardware key exists and if it is found to exist, it is linked as a part of the aid device program module and the function of certifying the hardware key is caused to operate.

10 Claims, 15 Drawing Sheets

PROGRAMMABLE CONTROLLER SYSTEM AND AID DEVICE FOR CONTROL PROGRAM DEVELOPMENT THEREFOR

This application claims priority on Japanese Patent Applications 2005-280437 filed Sep. 27, 2005 and 2006-256131 filed Sep. 21, 2006.

BACKGROUND OF THE INVENTION

This invention relates to a programmable controller system formed by connecting a programmable controller (hereinafter referred to as PLC) and a personal computer functioning as a control program development aid device through a communication means and in particular to such a PLC system having a user certification function.

Such PLC systems formed by connecting a PLC and a personal computer functioning as a control program development aid device through a communication means have been known. FIG. 15 shows an example of such a system comprising a PLC 2 and a personal computer 1a functioning as a control program development aid device 1, connected together by a communication means such as RS232C. In FIG. 15, A1 indicates a password memory area and A2 indicates a user program memory area.

The control program development aid device 1 is adapted to carry out communications with the PLC 2 through the communication means such as RS232C and to write and read a program into and from the user program memory area A2 through this communication means. The control program development aid device 1 is further adapted to monitor data in the memory area for setting the operations of the PLC 2 and the data in the memory area for storing input data from and output data to any target device.

The user certification function is incorporated in this PLC system. Japanese Patent Publication Tokkai 2003-162507, for example, has disclosed a PLC system of this kind having a user certification system. Explained more in detail, the password memory area A1 and the user program memory area A2 are provided to the PLC 2. When a communication command for reading out a program is issued from the control program development aid device 1 to the PLC 2, if any password data are written in the password memory area A1 in the PLC 2, the PLC 2 returns to the control program development aid device 1 a respond code which indicates that it is not possible to read out the program.

Both the password setting function and the password releasing function are incorporated to the control program development aid device 1. As the password setting function is activated, password data are written into the password memory area A1 of the PLC 2. As the password releasing function is activated, password data are read out from the password memory area A1 of the PLC 2 to the control program development aid device 1. At this moment, if the control program development aid device 1 ascertains that the password data inputted for releasing the password setting condition and the password data read out from the PLC 2 match, initialization of the password memory area A1 on the PLC 2 (the condition in which the password setting condition is released) becomes possible.

Problems as will be explained below are being pointed out, however, with PLC systems provided with such a prior art user certification function (the function of judging whether it is a certified user or not by using a password). Firstly, since the user certification method is a common method (such that it is written in a manual accessible to any user), any third party can pretend to be a normal user, say, by analyzing the mechanism of the user certification and repeating the input of password by trial and error. Secondly, there is a likely scenario that a normal user forgets to reset a protect after once releasing it by inputting the password to read out a program such that it becomes possible for anybody who comes later to read out the program.

SUMMARY OF THE INVENTION

It is therefore an object of this invention in view of such problems of PLC systems with a prior art user certification function to provide an improved PLC system having a user certification function with a higher level of security.

Other objects and functions of this invention will become clear to a person skilled in the art based on from the specification that follows.

A programmable controller system of this invention includes a PLC having a password protect function, a control program development aid device structured as a personal computer having a control program development aid device program module installed therein, and a communication means for connecting them.

The PLC is provided with a password memory means, a protect setting means for storing a protect setting condition by writing a specified password in the password memory means in response to a protect setting command received through the communication means, a protect releasing means for storing a protect releasing condition by erasing or initializing the password stored in the password memory means in response to a password releasing command received through the communication means, and an executing means for executing specified operations in response to one of operation commands that include program write-in command and program readout command if protect is released. The control program development aid device is provided with a command creating means for creating operation commands in response to a specified operation, and an add-on function executing means for carrying out an add-on function by responding to the creation of an operation command by the command creating means to add a protect releasing command and a protect setting command each with a specified unpublished password in front and behind the created operation command and to issue the commands to the programmable controller. The add-on function executing means is adapted to carry out the add-on function as a software module different from the control program development aid device program module with a function as the control module program development aid device, and the control program development aid device program module is adapted to check at the time of startup thereof whether or not the software module with the add-on function exists in an external memory device of the personal computer, to link, if the software module with the add-on function exists, the software module with the add-on function as a part of a program of the control program development aid device program module, and to cause the add-on function to operate.

According to a preferred embodiment of this invention, the aforementioned personal computer having a control program development aid device program module installed therein has a hardware key detachably attached thereto, the hardware key containing a memory that stores a specified password code, and the software module with the add-on function is adapted to operate the add-on function on the condition that the hardware key be certified.

According to another preferred embodiment of the invention, the aforementioned unpublished password used by the add-on function corresponds to the specified password code in the hardware key.

A programmable controller system according to still another preferred embodiment of the invention further comprises means for issuing a communication command for setting protect in response to a specified operation and for issuing a communication command for releasing protect in response to another specified operation, and the programmable controller system is manually operable for protect setting and protect releasing if the personal computer is not provided with the software module with the add-on function.

The invention also relates to a control program development aid device which is connectable through communication means to a programmable controller having password protect function and is formed by installing a control program development aid device program module to a personal computer. Such a control program development aid device is provided with a command creating means for creating operation commands in response to a specified operation, and an add-on function executing means for carrying out an add-on function by responding to the creation of an operation command by the command creating means to add a protect releasing command and a protect setting command each with a specified unpublished password in front and behind the created operation command and to issue the commands to the programmable controller. The add-on function executing means is adapted to carry out the add-on function as a software module different from the control program development aid device program module with a function as the control module program development aid device, and the control program development aid device program module is adapted to check at the time of startup thereof whether or not the software module with the add-on function exists in an external memory device of the personal computer, to link, if the software module with the add-on function exists, the software module with the add-on function as a part of a program of the control program development aid device program module, and to cause the add-on function to operate.

According to a preferred embodiment of this invention, the aforementioned personal computer having a control program development aid device program module installed therein has a hardware key detachably attached thereto, the hardware key containing a memory that stores a specified password code, and the software module with the add-on function is adapted to operate the add-on function on the condition that the hardware key be certified.

According to another preferred embodiment of the invention, the aforementioned unpublished password used by the add-on function corresponds to the specified password code in the hardware key.

A control program development aid device according to still another preferred embodiment of the invention further comprises means for issuing a communication command for setting protect in response to a specified operation and for issuing a communication command for releasing protect in response to another specified operation, and the programmable controller system is manually operable for protect setting and protect releasing if the personal computer is not provided with the software module with the add-on function.

The invention further relates to a control program development aid device which is connectable through communication means to a programmable controller having password protect function and is formed by installing a control program development aid device program module to a personal computer. This control program development aid device is provided with a command creating means for creating operation commands in response to a specified operation, and an add-on function executing means for carrying out an add-on function by responding to the creation of an operation command by the command creating means to add a protect releasing command and a protect setting command each with a specified unpublished password in front and behind the created operation command and to issue the commands to the programmable controller. In addition, a hardware key including a memory that stores a specified password code is detachably attached to this control program development aid device. The control program development aid device program module is adapted to check at the time of startup thereof whether or not a software module with a function of certifying a hardware key exists in an external memory device of the personal computer, to link, if the software module with the function of certifying a hardware key exists, the software module with this function as a part of a program of the control program development aid device program module, and to cause this function to operate.

Regarding the above, too, it is preferable to make operation of the add-on function on the condition that the hardware key be certified.

It is also preferable to make the aforementioned unpublished password used by the add-on function correspond to the specified password code in the hardware key.

It is further preferable for the control program development aid device to further comprise means for issuing a communication command for setting protect in response to a specified operation and for issuing a communication command for releasing protect in response to another specified operation, and for the programmable controller system to be manually operable for protect setting and protect releasing if the personal computer is not provided with the software module with the function of certifying the hardware key.

DETAILED DESCRIPTION OF THE INVENTION

Figure 1:
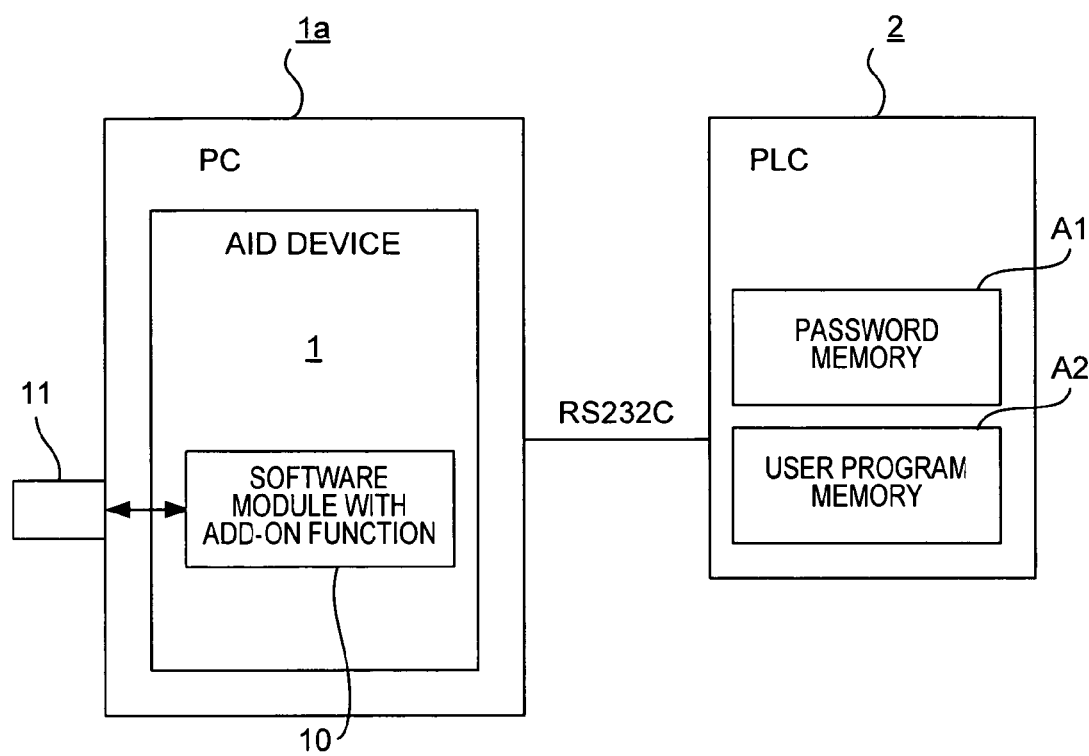
FIG. 1 is a schematic structural diagram of a PLC system embodying this invention.

FIG. 1 shows schematically an example of PLC system having a user certification function of this invention, comprising a PLC 2 and a personal computer (PC) 1a serving as a control program development aid device (hereinafter sometimes simply referred to as the "aid device") 1 connected together by means of a communication means (such as RS232C). In FIG. 1, A1 indicates a password memory area and A2 indicates a user program memory area. Programs created on the aid device 1 by the user (referred to as user programs, meaning that they are programs created by the user) are stored in the user program memory area A2 on the PLC 2.

Figure 3:
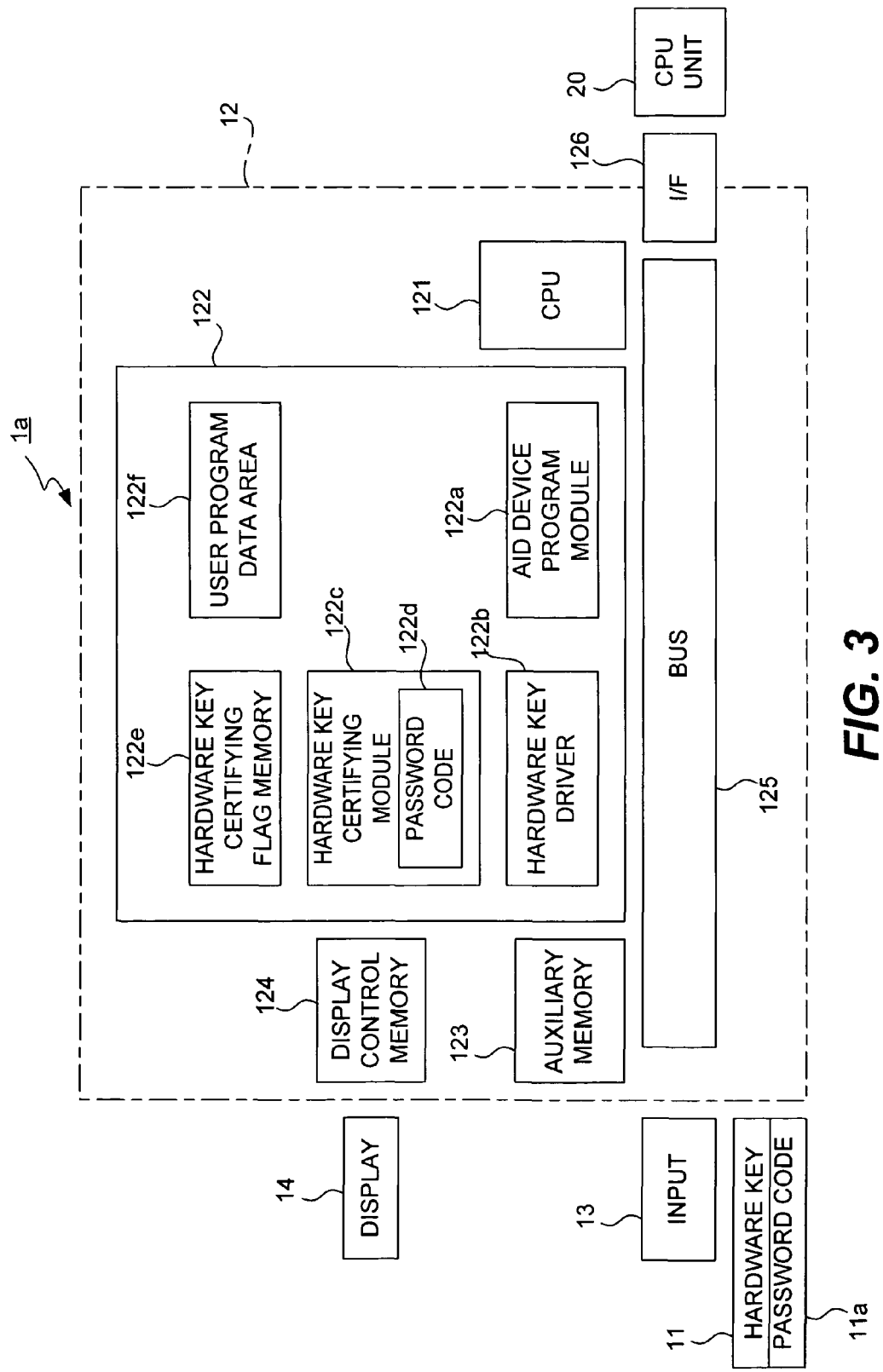
FIG. 3 is a structural diagram of the control program development aid device.

A software module 10 having an add-on function, which is an essential part of this invention, is incorporated into the aid device 1. The functions of this software module 10 will be explained in detail below. A hardware key 11 is detachably attached to the personal computer 1a. This hardware key 11 may comprise a detachably attachable memory medium such as a flash memory (commonly referred to as a USB memory) having a case with a USB plug attachable to the USB socket of the personal computer 1a. A specified password code 11a is stored in this hardware key 11 (as shown in FIG. 3).

Figure 2:
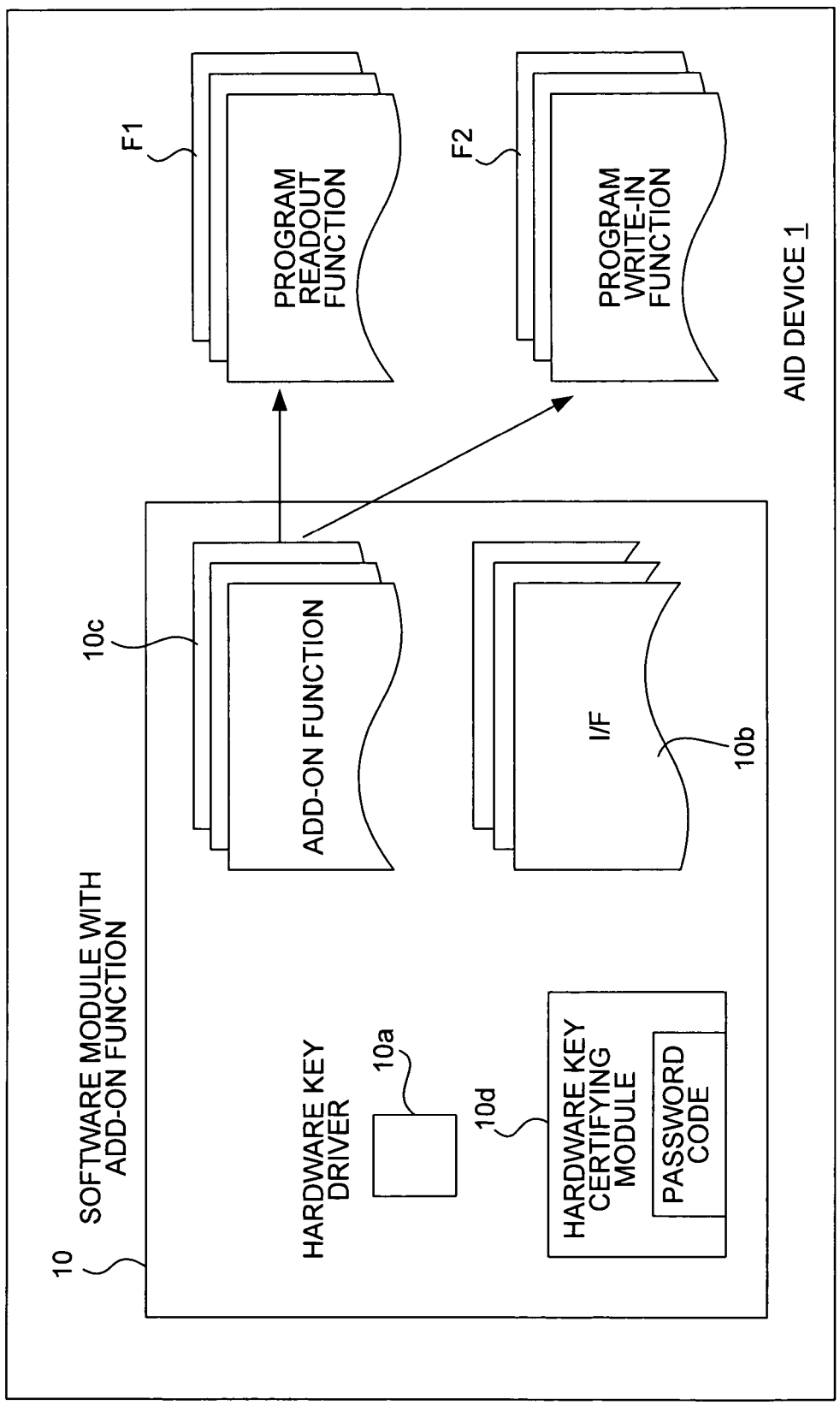
FIG. 2 is a software structural diagram of the control program development aid device.

The software structure of the aid device 1 is shown in FIG. 2, wherein numeral 1 indicates the aid device 1 as program module, numeral 10 indicates the software module with the add-on function, F1 indicates the program readout function which is a software function, and F2 indicates the program write-in function which is also a software function. The programs which are to be read out by the program readout function F1 are the user programs stored in the user program memory area A2 on the PLC 2. The programs which are the target of the program write-in function F2 are the user programs on the aid device 1.

As shown in FIG. 2, a hardware key driver 10a, an interface (I/F) 10b with the hardware key driver 10a, an add-on function 10c to be described below in detail and a hardware key certifying module 10d are included in the software module 10 with the add-on function. As will be explained in more detail below, the aid device 1 includes a mechanism for automatically carrying out password setting and releasing at the time of user's operation (such as the time of user program readout and write-in operations) as its add-on function.

More specifically, when the user's operation is the user program readout operation, for example, this add-on function may be for carrying out a specified operation according to a specified routine as shown below such that the period for releasing and setting the password protect will be a minimum when the user program is being read out, wherein the specified routine comprises:

First step of sending a communication command for readout to the PLC by communication through RS232C, waiting for a response and judging whether a protect is set or released on the side of the PLC;

Second step of initializing the password memory area in the PLC if it is judged that protect is set in the first step and directly skipping to the following third step if it is judged that protect is released; and Third step of carrying out the process of reading out the program and thereafter writing the password in the password memory area and ending the routine if it was judged in the previous (second) step that the protect was set.

As will be explained in detail below, such add-on function may be realized by an internal process as follows by the aid device:

First step wherein the aid device is started up;

Second step wherein the aid device checks during its initialization process whether or not a software module file with add-on function exists in the auxiliary memory device in the personal computer;

Third step wherein a software module with add-on function, if it exists in the auxiliary memory device in the personal computer, is read out to the memory space of the personal computer carrying out the aid device and is linked to the aid device module such that the add-on function becomes executable thereafter; and Fourth step wherein the later processes are continued if a software module with add-on function does not exist within the auxiliary memory device in the personal computer.

The software module with add-on function is capable of certifying a hardware key and making it a condition for executing the add-on function. Specifically, the software module with add-on function includes the process of certifying the hardware key. If the hardware key is certified, the add-on function comes to be in the executable condition.

The password data that are matched with the memory data of the password memory area or used for writing into the password memory area may be made as password corresponding to the certification data in the hardware key which cannot be set or released by the user by using an aid device of a prior art PLC system. It is preferable from the point of view of security to cause such password data be held within a software module having add-on function.

FIG. 3 shows the structure of the personal computer 1a which forms the aid device 1. As shown, the personal computer 1a comprises a main body 12, an input device 13 including a mouse and a keyboard and a display device 14 formed with a CRT or a liquid crystal display.

The personal computer main body 12 and the CPU unit 20 can exchange data through an interface (such as RS2332C) 126. The hardware key 11 is mounted to the main body 12 in a detachable way. The hardware key 11 is for connecting to the parallel port or the serial port of the personal computer, having a memory inside and the password code 11b being stored in this memory.

Inside the main body 12, there are contained a CPU 121 for controlling the system as a whole, a memory 122, an auxiliary memory device 123 such as a hard disk, a display control memory 124 and a system bus 125 connecting these.

An aid device program module and a software module having an add-on function are stored inside the auxiliary memory device 123 and are provided on the memory 122 by a startup command of the aid device program.

In the illustrated example, the memory 122 contains therein an aid device program module 122a, a hardware key driver 122b for accessing the hardware key through the bus, a hardware certification module 122c provided with a password code 122d for certifying the hardware key, a hardware key certification flag memory area 122e and a user program data area 122f. Although not shown in the figure, a software module for executing an add-on function is also provided on the memory 122.

As software constitutional elements, the aid device program module 122a, the hardware key driver 122b and the hardware certification module 122c are provided.

The password code 122d provided to the hardware certification module 122c and the password code 11a stored in the hardware key are the same code and are preliminarily set by the user. If the hardware key 11 is correctly certified by the hardware certification module 122c, a value which signifies that the hardware key certification has been correctly done is set in the hardware key certification flag memory area 122e which is on the memory space of the CPU.

Figure 4:
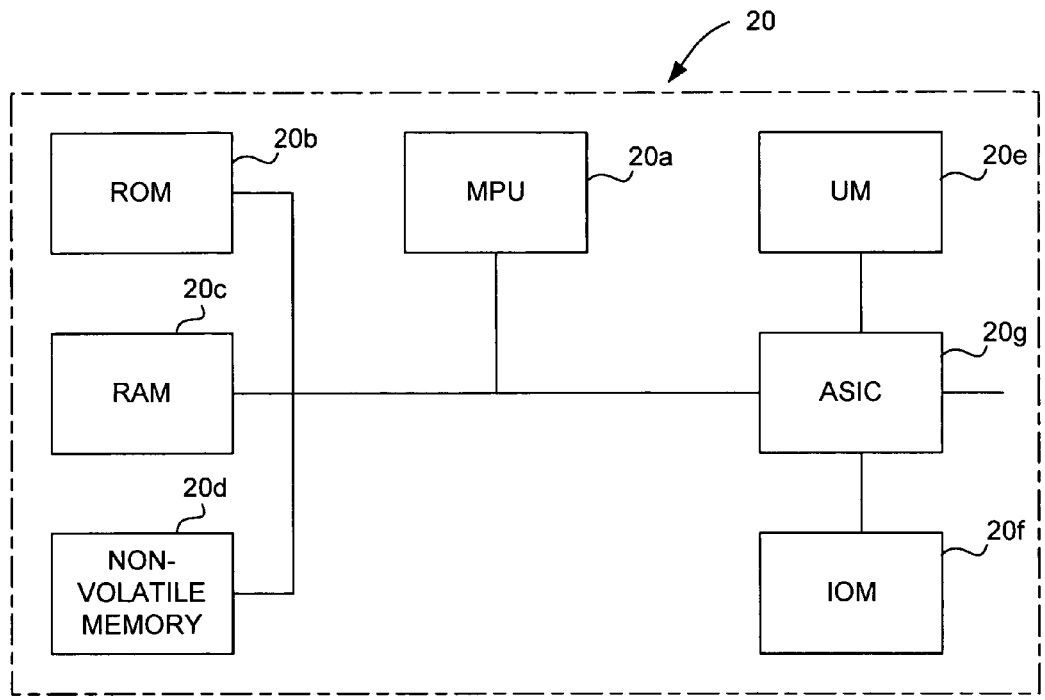
FIG. 4 is a structural diagram of the CPU unit of the PLC.

FIG. 4 shows the structure of the CPU unit of the PLC. This PLC is of the so-called building block type, the whole of the PLC being formed by including an I/O unit, a special-function unit, etc. in addition to the CPU unit. Of these units, FIG. 4 shows only the CPU unit 20. As shown, the CPU unit 20 includes a microprocessor 20a for controlling the CPU unit as a whole, a ROM 20b that stores various system programs necessary for realizing the functions as a PLC, a work RAM 20c used for temporarily storing the intermediate results of various calculations, etc., a non-volatile memory 20d for storing data such as the setting of abnormality report and abnormal status, a user memory 20e for storing control programs created by the user (user programs), an input-output memory (IOM) 20f functioning as a memory assigned to external I/O and a data memory used by user programs and an ASIC 20g for carrying out memory access bus arbitration process, etc.

Figure 13:
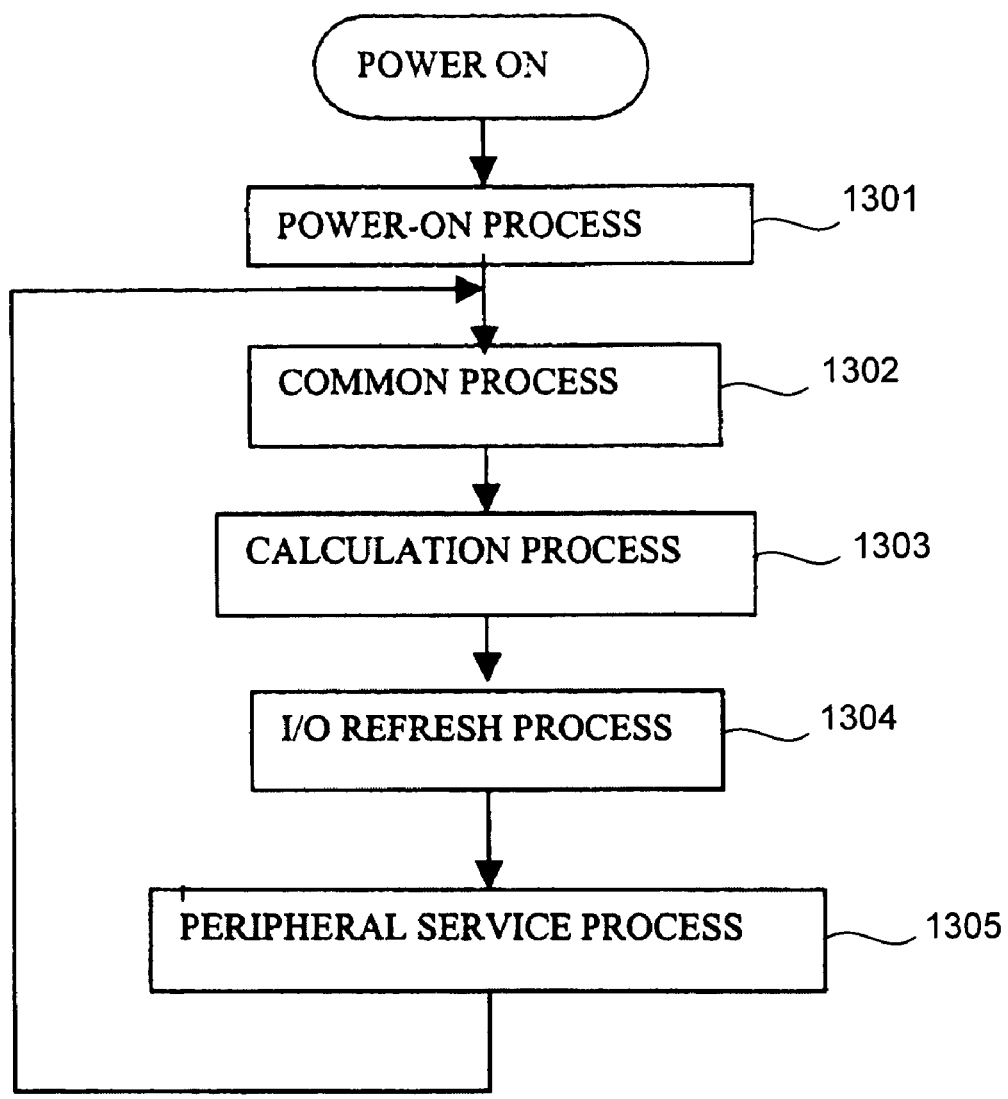
FIG. 13 is a general flowchart of overall process by the PLC.

Basic functions and processes of a PLC of this type are well known and hence will not be described. As shown in FIG. 13, for example, it may be structured such that after an initial process (at the time of power-on) (Step 1301) is carried out and a common process (Steps 1302) is carried out next, a calculation process (Step 1303), an I/O refresh process (Step 1304) and a peripheral service process (Step 1305) are carried out cyclically.

Figure 5:
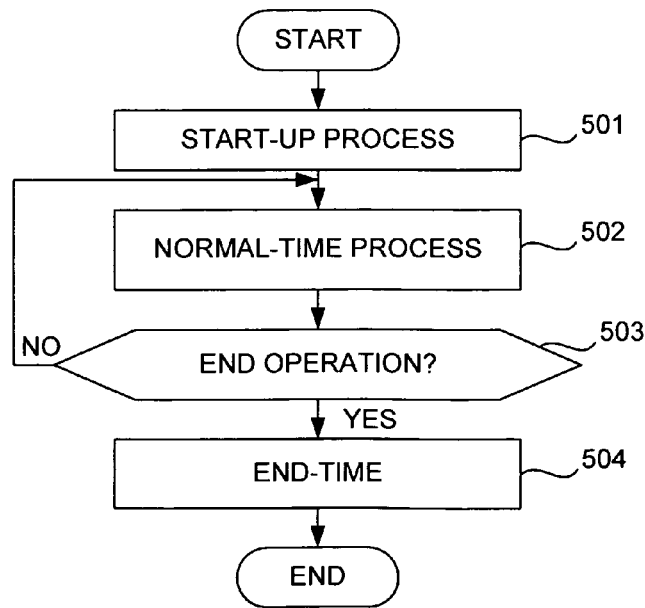
FIG. 5 is a general flowchart showing the whole process by the control program development aid device.

FIG. 5 is a general flowchart showing the whole process by the aid device. As shown, the process by the aid device is formed with a startup process (Step 501) which is carried out immediately after a startup command by the user's operation is received, a normal-time process (Step 502) that is carried out thereafter repeatedly and an end-time process (Step 504) carried out after waiting for an end operation (YES in Step 503).

Figure 6:
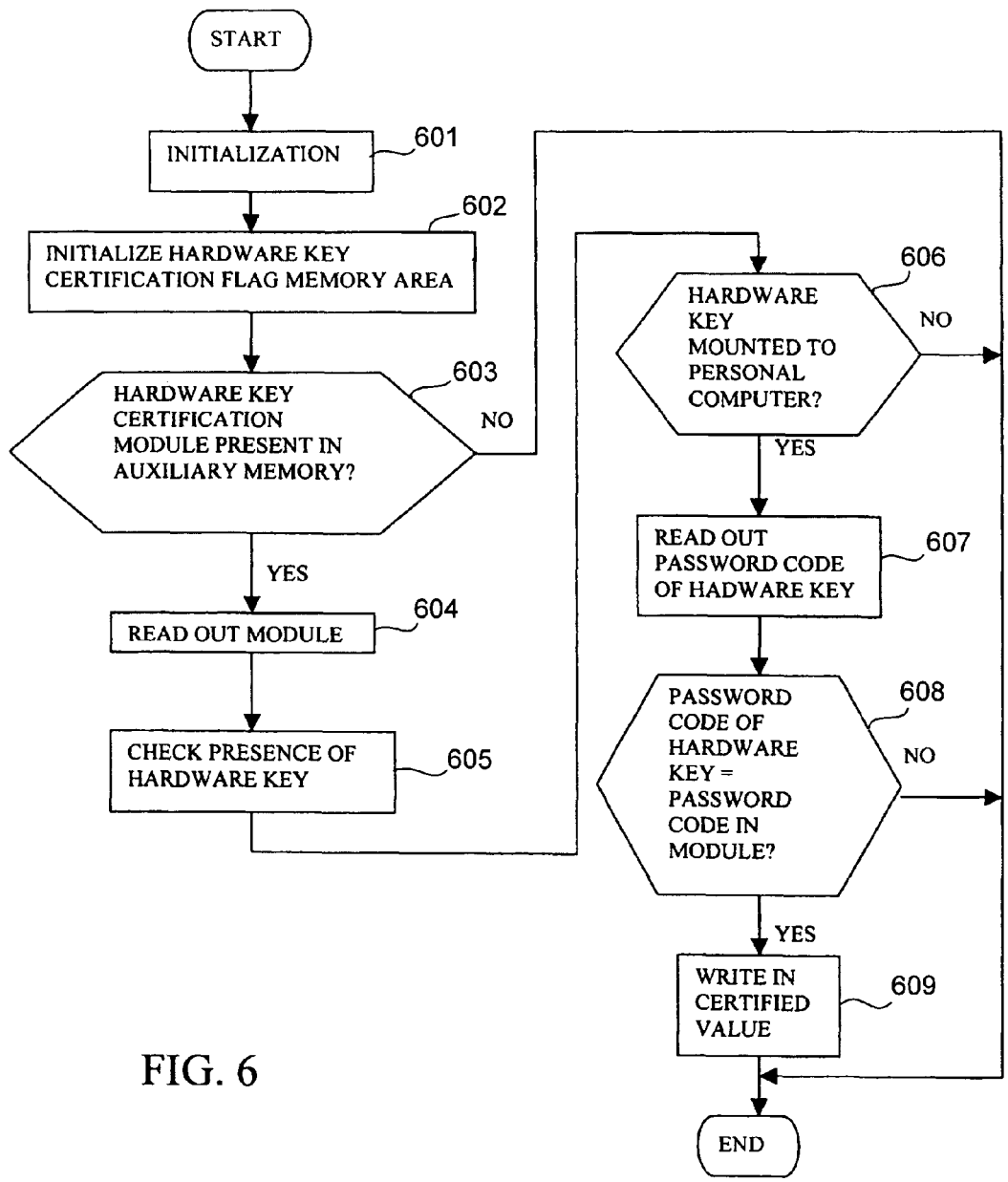
FIG. 6 is a detailed flowchart of the startup process.

Details of the startup process (Step 501) are shown in FIG. 6. As this process is started, after an initialization process (Step 601) is carried out for the whole of the hardware and software, the "hardware key certification flag memory area" 122e which is assigned to the memory space on the personal computer is initialized (Step 602). This memory area 122e has two values indicating whether the hardware key 11 mounted to the personal computer 1a has been certified or not. By this initialization process, the value indicating that certification has not been done is set.

Next, it is checked whether or not the hardware certification module 122c exists in the auxiliary memory device 123 (Step 603). If it is found to exist (YES in Step 603), the hardware certification module 122c is read out into the memory area of the personal computer 1a so as to operate as a portion of the aid device program module 122a (Step 604). Step 603 is a process for checking whether or not a software module with an add-on function exists in the personal computer because the hardware certification module 122c is included in a software module with an add-on function. As long as it is included in a software module with an add-on function, it does not matter which software module or data file.

Next, it is checked whether or not the hardware key 11 is mounted to the personal computer 1a through the hardware key driver (software module) 122b (Step 605). If it is found that the hardware key 11 is mounted to the personal computer 1a (YES in Step 605), the password code 1a stored on the memory of the hardware key 11 is read out through the hardware key driver (software module) 122b (Step 607) and compared with the password code 122d inside the hardware certification module 122c.

If the password code 11a stored on the memory of the hardware key 11 and the password code 122d inside the hardware certification module 122c match (YES in Step 608), the value indicating that the certification was done is set in the hardware key certification flag memory area 122e (Step 609). If the hardware certification module 122c does not exist (NO in Step 603), the startup process (Step 501 of FIG. 5) is terminated immediately and the normal-time process (Step 502 of FIG. 5) is carried out, the aid device operating as an aid device of the prior art security level.

Although the hardware certification module 122c may be present (YES in Step 603), if the hardware key 11 does not exist (NO in Step 606) or the password code 11a stored on the memory of the hardware key 11 and the password code 122d inside the hardware certification module 122c do not match (NO in Step 608), the aid device operates as an aid device of the prior art security level.

It is therefore to be understood that the password protect function operates at the high security level of this invention only if both the hardware key 11 and the hardware certification module 122c are present and if the password code 11a stored on the memory of the hardware key 11 and the password code 122d inside the hardware certification module 122c do match.

Figure 7:
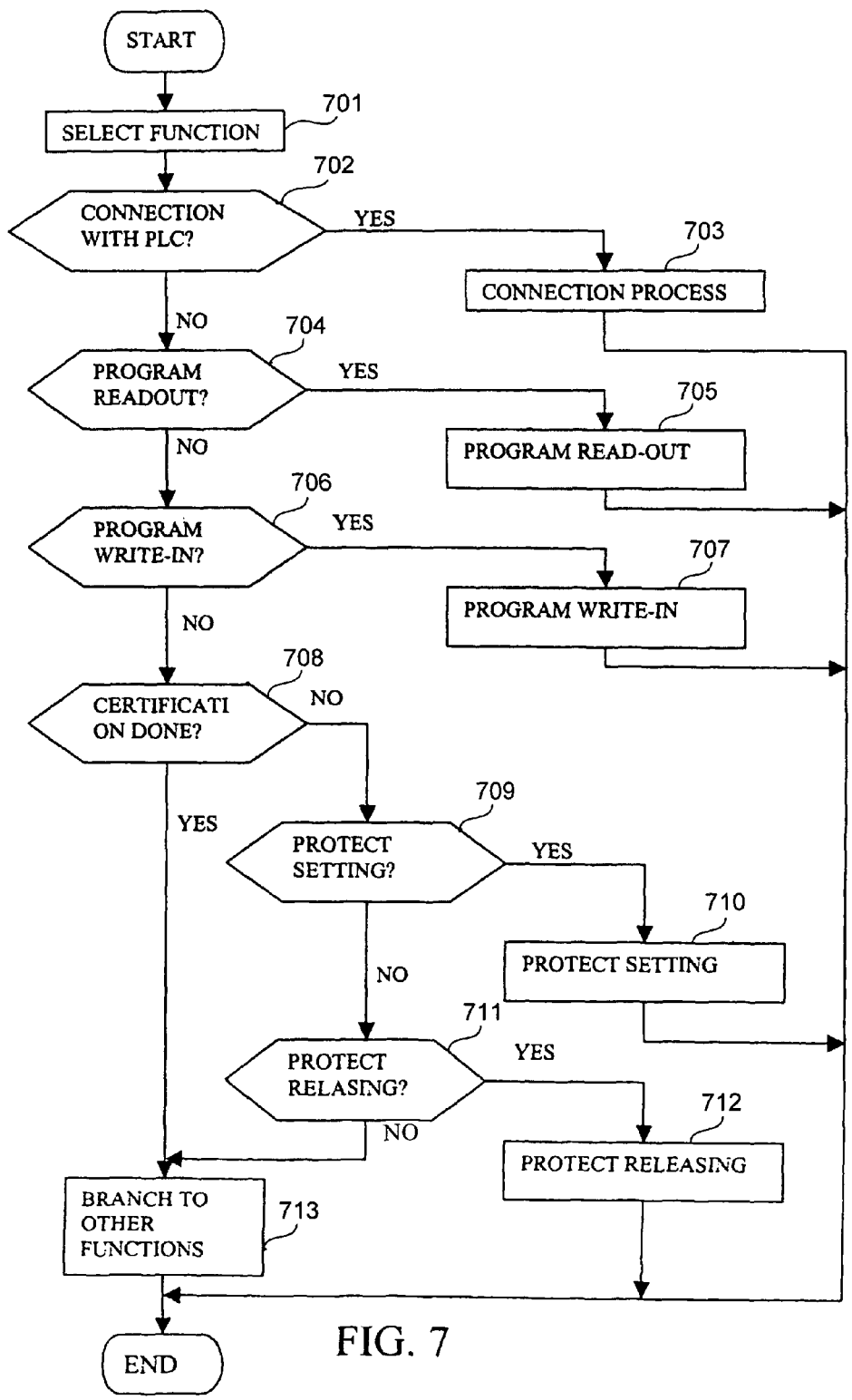
FIG. 7 is a detailed flowchart of the normal-time process.

Details of the normal-time process (Step 502) are shown by the flowchart of FIG. 7. As shown, it is judged in this process which of the available functions has been selected (Step 701) through the mouse and the keyboard of the input device 13 of the personal computer 1a (Step 702, 704, 706, 708, 709 or 711) and any one of the PLC connection process (Step 703), the PLC program readout process (Step 705), the PLC program write-in process (Step 707), the PLC program protect setting process (Step 710) or the PLC program protect releasing process (Step 712) is selectively carried out. In the above and what follows, "PLC program" will means a user program stored in the user program memory area A2 of the PLC 2.

Figure 8:
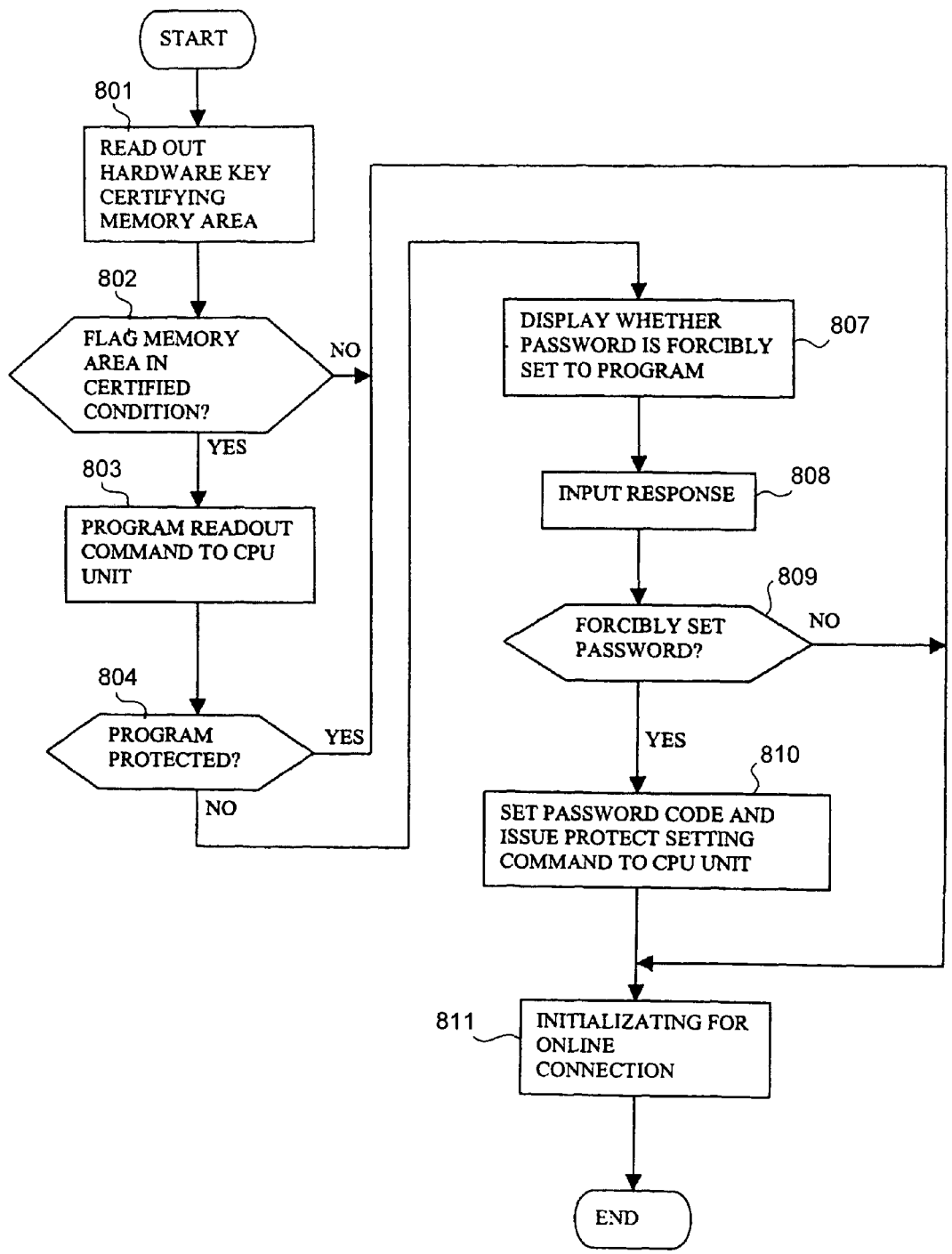
FIG. 8 is a detailed flowchart of the connection process with the PLC.

Details of the connection process with the PLC (Step 703) are shown by the flowchart of FIG. 8. As this process is started, the value set in the hardware key certification flag memory area 122e is read out (Step 801) and it is determined accordingly whether certification has been done or not (Step 802). If certification is done (YES in Step 802), a communication command is issued to the CPU unit 20 to read out a program (PLC program, as explained above) (Step 803) and a response is returned from the CPU unit 20, indicating whether the program can be read out normally or not. On the basis of this response to the communication command, it is judged whether this program is under protect or not (Step 804).

If the program is judged to be not protected (NO in Step 804), the operator is asked whether or not the password 11a of the hardware key 11 should be forcibly set to the program (Step 807). As a response is obtained from the operator (Step 808), a judgment is made whether the password 11a of the hardware key 11 should be forcibly set or not (Step 809). If the response is to forcibly set the password 11a of the hardware key 11 (YES in Step 809), the password code 122d inside the hardware certification module 122c is set and a communication command is issued to the CPU unit 20 for forcibly setting protect (Step 810).

An initialization process for online connection (such as monitor starting process) is carried out thereafter (Step 811) and the connection process to the PLC 2 ends.

If the value set in the hardware key certification flag memory area 122e indicates that certification is not made (NO in Step 802), Steps 803 and 810 are both skipped, the initialization process for online connection is carried out immediately (Step 811) and the connection process to the PLC 2 ends.

Although the value set in the hardware key certification flag memory area 122e indicates that certification is made (YES in Step 802), if the program is protected (YES in Step 804), Step 801 is skipped and the initialization process for online connection is carried out (Step 811).

Thus, if the hardware key 11 is correctly certified, the password is automatically set at the time of online connection, and only an aid device with the correctly certified hardware key 11 creates a condition wherein programs can be read out and written in.

Figure 9:
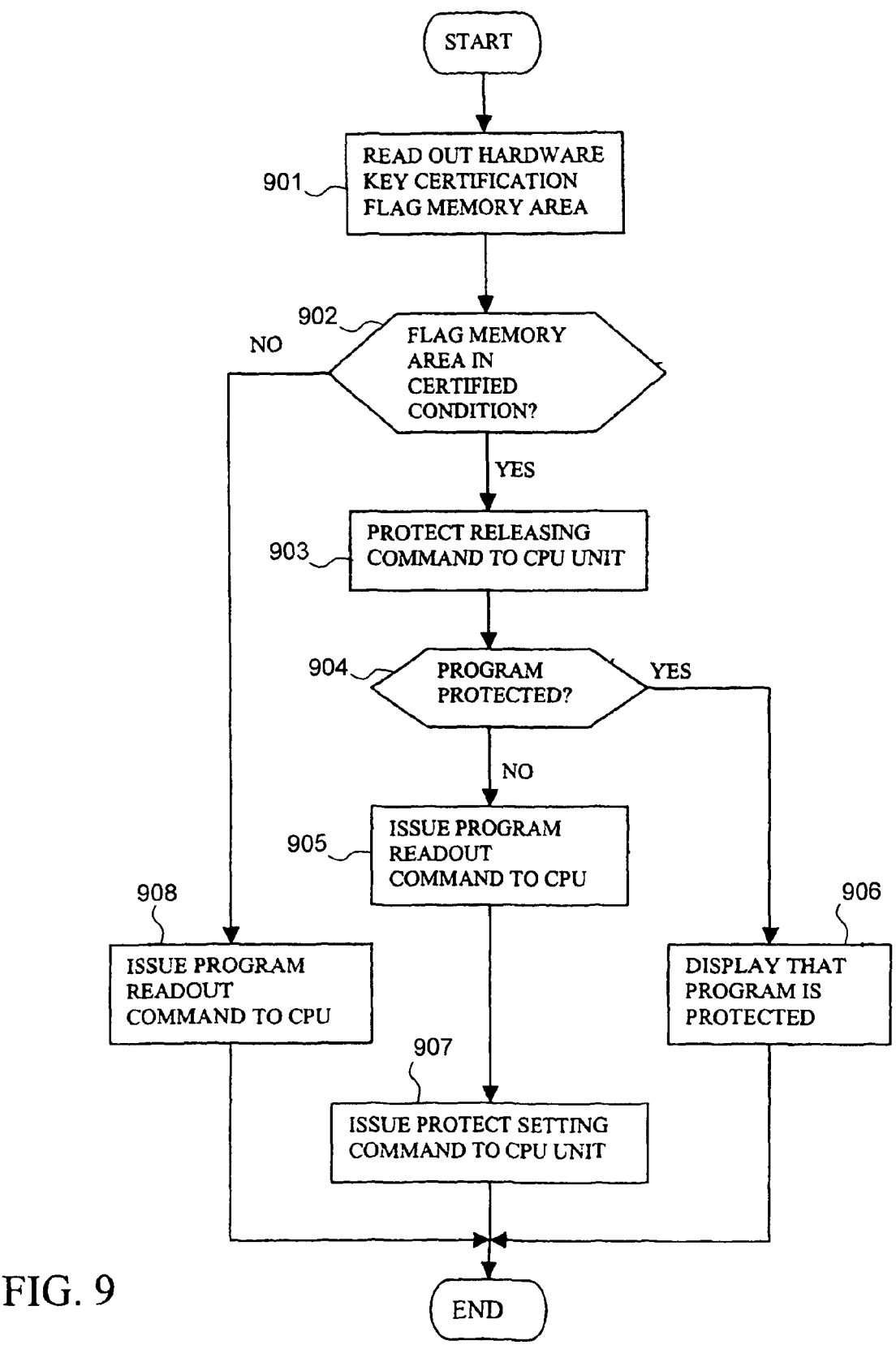
FIG. 9 is a detailed flowchart of the PLC program readout process.

Details of the PLC program readout process (Step 705) are shown by the flowchart of FIG. 9. As this process is started, the value set in the hardware key certification flag memory area 122e is read out (Step 901) and it is determined accordingly whether certification has been done or not (Step 902). If certification is done (YES in Step 902), a communication command is issued to the CPU unit 20 through the communication interface 126 to release program protect (step 903), and it is judged whether the program is under protect or not (Step 904) based on a response from the CPU unit 20.

If the program is judged to be not protected (NO in Step 904), a communication command for reading out the program is issued to the CPU unit 20 (Step 905). Thereafter, a communication command for setting program protect is issued to the CPU unit 20 through the communication interface 126 (Step 907) and the process comes to the end. If the program is judged to be protected (YES in Step 904), this effect is displayed on the display device 14 (Step 906) and the process is ended.

Thus, the protect status of the program is released or set immediately before or after the program is read out to prevent the access from any other aid device that is connected.

Figure 10:
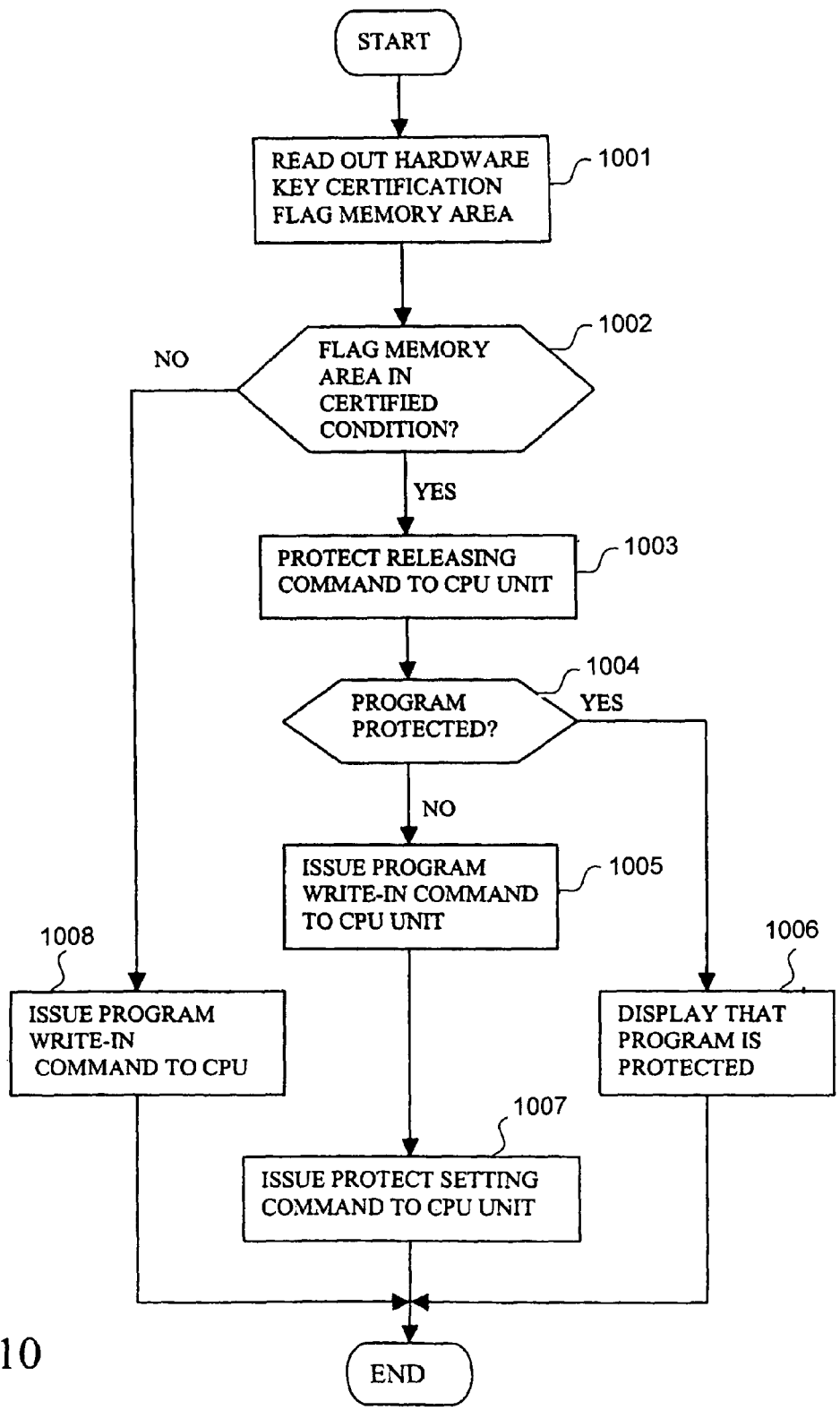
FIG. 10 is a detailed flowchart of the PLC program write-in process.

Details of the PLC program write-in process (Step 707) are shown by the flowchart of FIG. 10. As this process is started, the value set in the hardware key certification flag memory area 122e is read out (Step 1001) and it is determined accordingly whether certification has been done or not (Step 1002). If certification is done (YES in Step 1002), a communication command is issued to the CPU unit 20 through the communication interface 126 to release program protect (step 1003), and it is judged whether the program is under protect or not (Step 1004) based on a response from the CPU unit 20.

If the program is judged to be not protected (NO in Step 1004), a communication command for writing in the program is issued to the CPU unit 20 (Step 1005). Thereafter, a communication command for setting program protect is issued to the CPU unit 20 through the communication interface 126 (Step 1007) and the process comes to the end. If the program is judged to be protected (YES in Step 1004), this effect is displayed on the display device 14 (Step 1006) and the process is ended.

Thus, the protect status of the program is released or set immediately before or after the program is written in to prevent the access from any other aid device that is connected.

Figure 11:
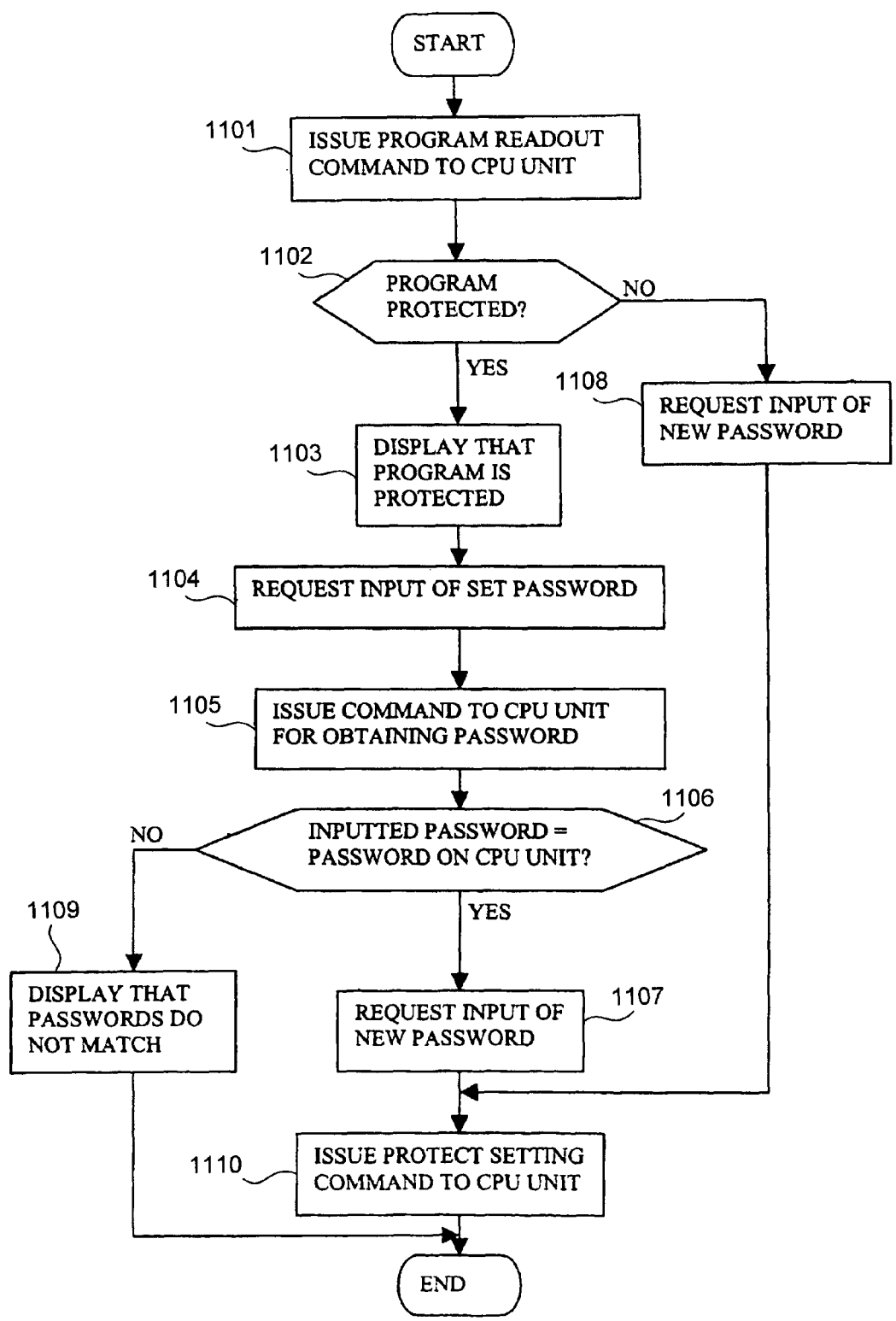
FIG. 11 is a detailed flowchart of the PLC program protect setting process.

Details of the PLC program protect setting process (Step 710) are shown by the flowchart of FIG. 11. This is for explaining the protect setting process when operating as an aid device having a prior art security level. This process is adapted to be carried out in the startup process shown in FIG. 6 if either the hardware key 11 or the hardware certification module 122c is absent or if, although they are present, the password codes 11a and 122d respectively in the hardware key 11 and the hardware certification module 122c do not match.

As this process is started, after the communication command for reading out the program is issued to the CPU unit 20 (Step 1101), it is checked whether or not the program is protected (Step 1102) based on the response to this communication command. If it is judged to be protected on the basis of the response from the CPU unit 20 (YES in Step 1102), it is displayed to this effect through the display device 14 (Step 1103) and the program waits for an input of set password from the operator (Step 1104). If a password is inputted by the operator, a communication command for obtaining a password is issued to the CPU unit 20 (Step 1105), the program waits for a response from the CPU unit 20, and the inputted password is compared with the password on the CPU unit 20 (Step 1106).

If it is judged that the inputted password and the password on the CPU unit 20 match (YES in Step 1106), the program waits for an input of a new password from the operator (Step 1108), a communication command is issued to the CPU unit 20 for program protect setting (inclusive of a new password) (Step 1110) and the process ends. If it is judged that the inputted set password and the password on the CPU unit 20 do not match (NO in Step 1106), on the other hand, it is displayed to this effect through the display device 14 (Step 1109).

If it is judged that the program is not protected (NO in Step 1102), the program waits for an input of a new password by the operator (Step 1108), a communication command for setting of program protect (inclusive of a new password) is issued to the CPU unit 20 (Step 1110) and the process ends.

Figure 12:
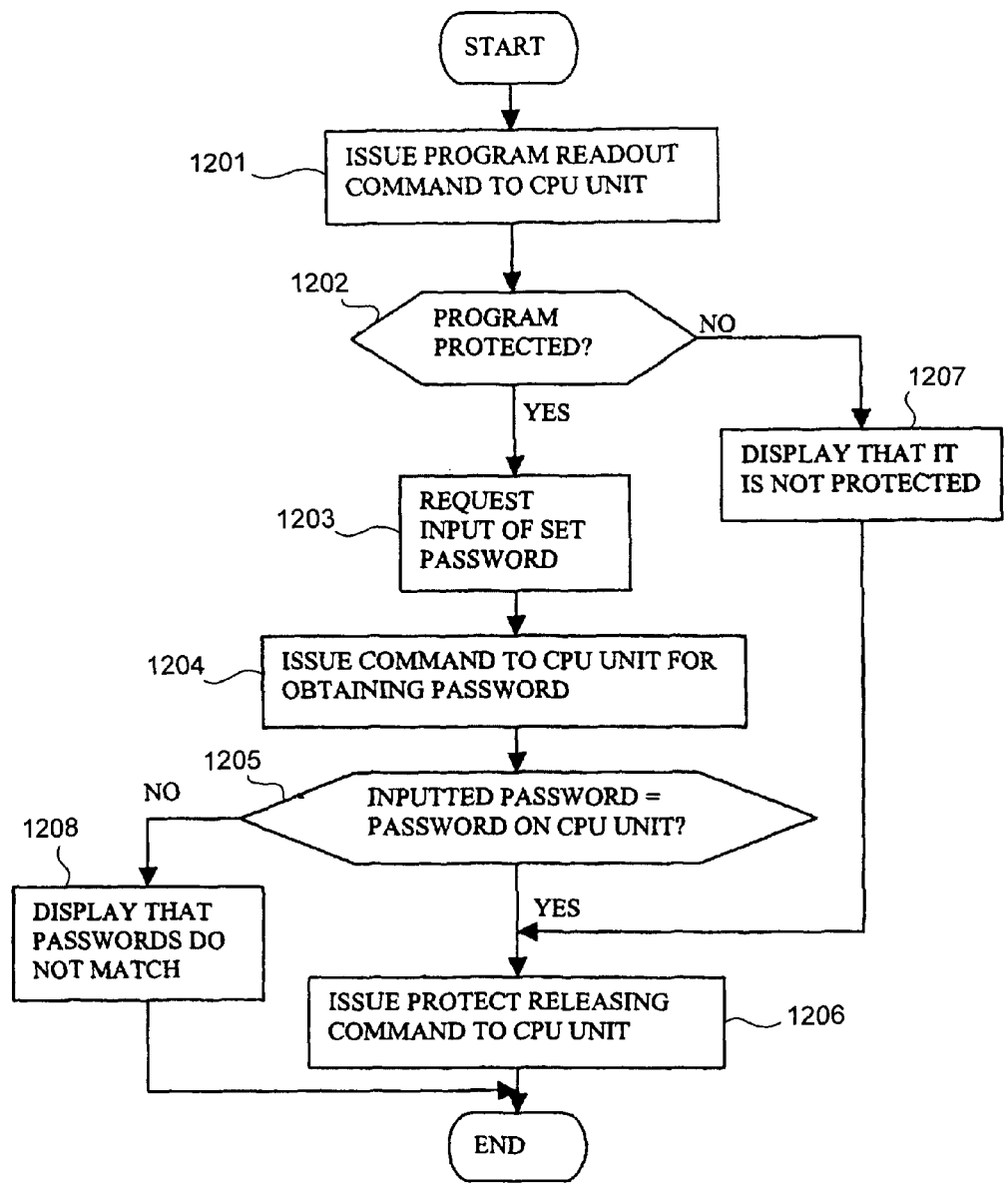
FIG. 12 is a detailed flowchart of the PLC program protect releasing process.

Details of the PLC program protect releasing process (Step 712) are shown by the flowchart of FIG. 12. This is for explaining the protect releasing process when operating as an aid device having a prior art security level. This process is adapted to be carried out in the startup process shown in FIG. 6 if either the hardware key 11 or the hardware certification module 122c is absent or if, although they are present, the password codes 11a and 122d respectively in the hardware key 11 and the hardware certification module 122c do not match.

As this process is started, after the communication command for reading out the program is issued to the CPU unit 20 (Step 1201), it is checked whether or not the program is protected (Step 1202) based on the response to this communication command. If it is judged to be protected on the basis of the response from the CPU unit 20 (YES in Step 1202), the program thereafter waits for an input of set password from the operator (Step 1203). If a password is inputted by an operator, a communication command for obtaining a password is issued to the CPU unit 20 (Step 1204), the program waits for a response from the CPU unit 20, and the inputted password is compared with the password on the CPU unit 20 (Step 1205).

If it is judged that the inputted password and the password on the CPU unit 20 match (YES in Step 1205), a communication command is issued to the CPU unit 20 for program protect releasing (Step 1206) and the process ends. If it is judged that the inputted password and the password on the CPU unit 20 do not match (NO in Step 1205), on the other hand, it is displayed to this effect through the display device 14 (Step 1208).

If it is judged that the program is not protected (NO in Step 1202), it is displayed to this effect through the display device 14 (Step 1207) and the process ends.

Figure 14:
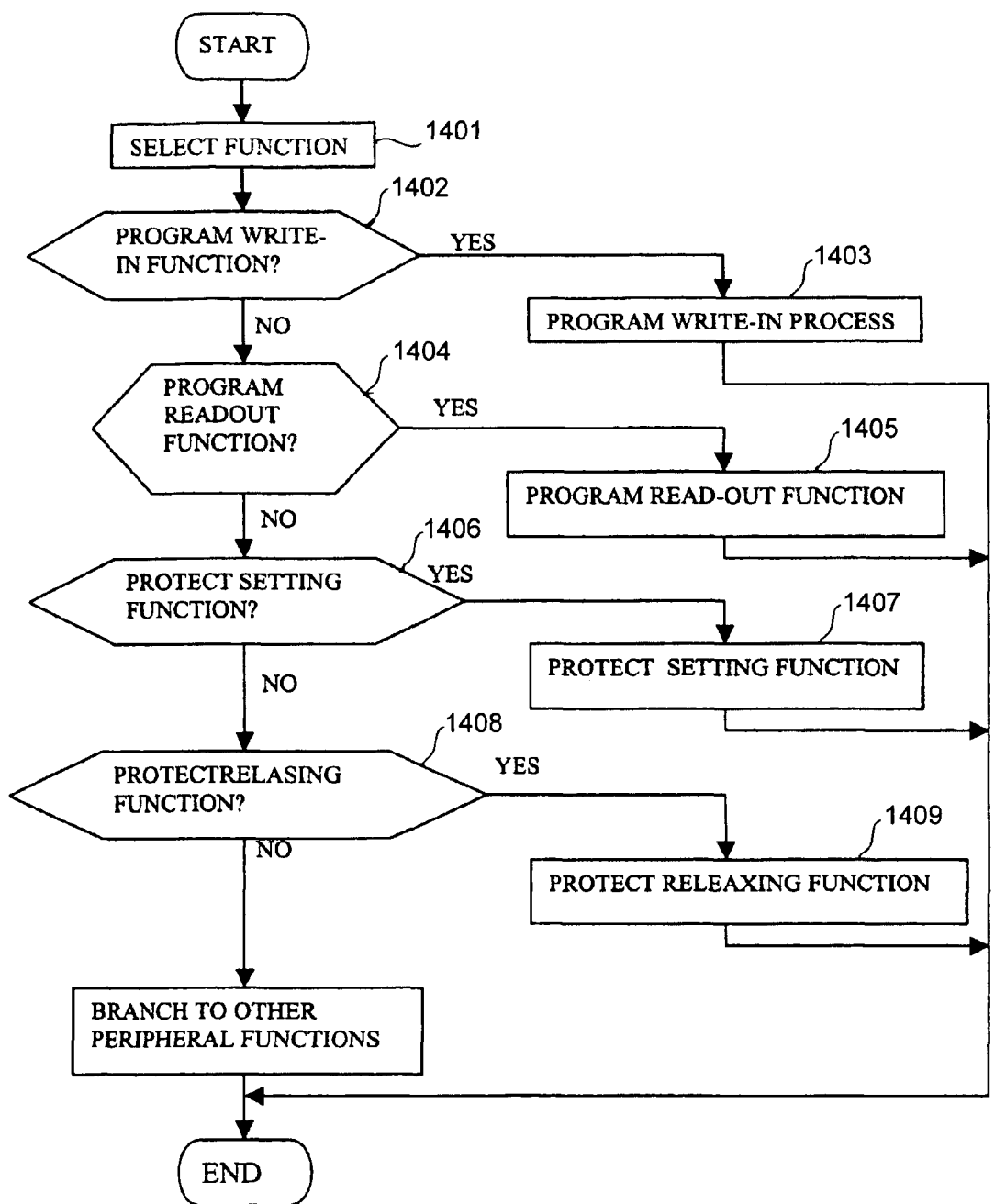
FIG. 14 is a detailed flowchart of the peripheral service process.
Figure 15:
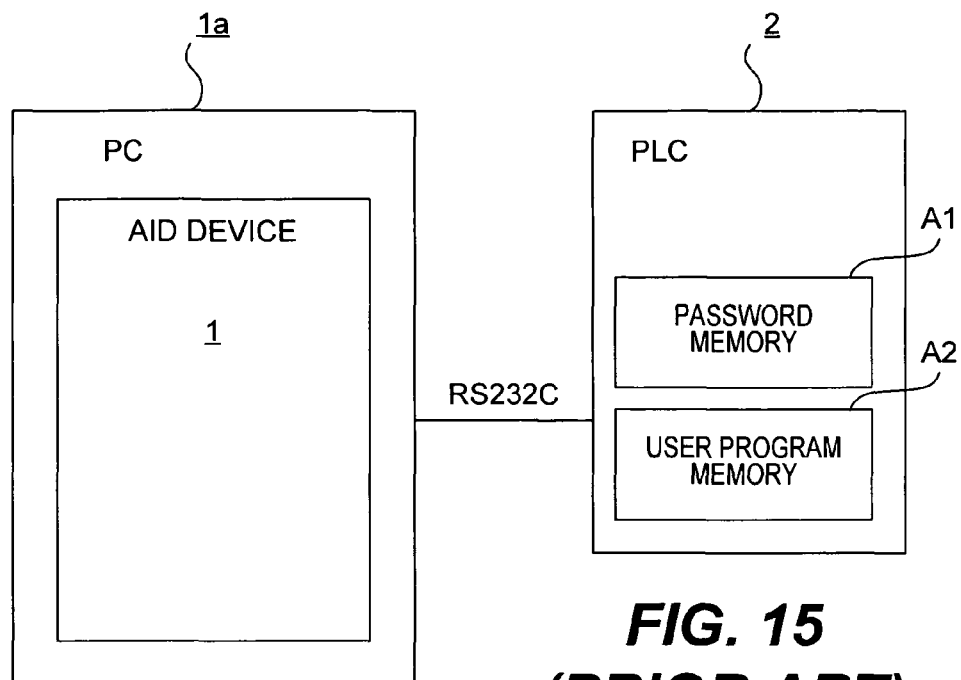
FIG. 15 is a schematic structural diagram of a prior art system.

Details of the peripheral service process are shown in FIG. 14. The user certification function is incorporated in the CPU unit of this PLC. As the routine according to FIG. 14 is started, the selection function is operated first (Step 1401) by checking the kind of the command received from the aid device 1 and thereby recognizing the function to be executed on the side of the CPU unit 20.

As explained above, since many kinds of communication command such as program write-in command, program readout command, protect setting command and protect releasing command are used by the PLC system, only portions corresponding to these commands will be selectively explained below.

If the program write-in function is selected (YES in Step 1402), the CPU unit 20 carries out a suitable program write-in process (Step 1403). Under the condition that protect is released, a user program arriving from the aid device 1 may be written into the user program area A2 (in FIG. 1). If the user program is protected, a response to this effect is returned to the aid device 1.

If the program readout function is selected (YES in Step 1404), the CPU unit 20 carries out a suitable program readout process (Step 1405). Under the condition that protect is released, a user program written in the user program area A2 may be transmitted to the aid device 1. If the user program is protected, a response to this effect is returned to the aid device 1.

If the protect setting function is selected (YES in Step 1406), the CPU unit 20 carries out a suitable protect setting process (Step 1407), say, by writing in a password code sent from the aid device 1 into the password memory area A1 and thereby storing the protect setting condition. If the protect setting has already been done, a response to this effect is returned to the aid device 1.

If the protect releasing function is selected (YES in Step 1408), the CPU unit 20 carries out a suitable protect releasing process (Step 1409), say, by erasing or initializing a password code written in the password memory area A1 and thereby storing the protect releasing condition. If the protect releasing has already been done, a response to this effect is returned to the aid device 1.

The routine may thereafter branch off to various other peripheral functions (Step 1410).

Figure 16:
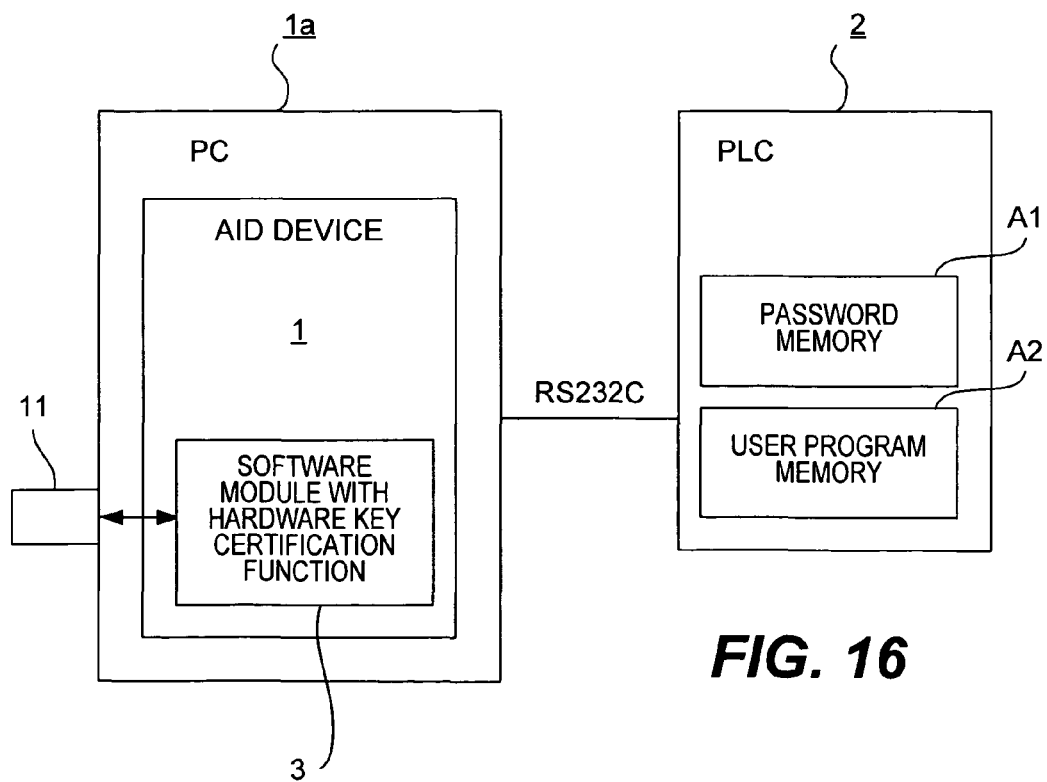
FIG. 16 is a schematic structural diagram of another PLC according to another embodiment of the invention.
Figure 17:
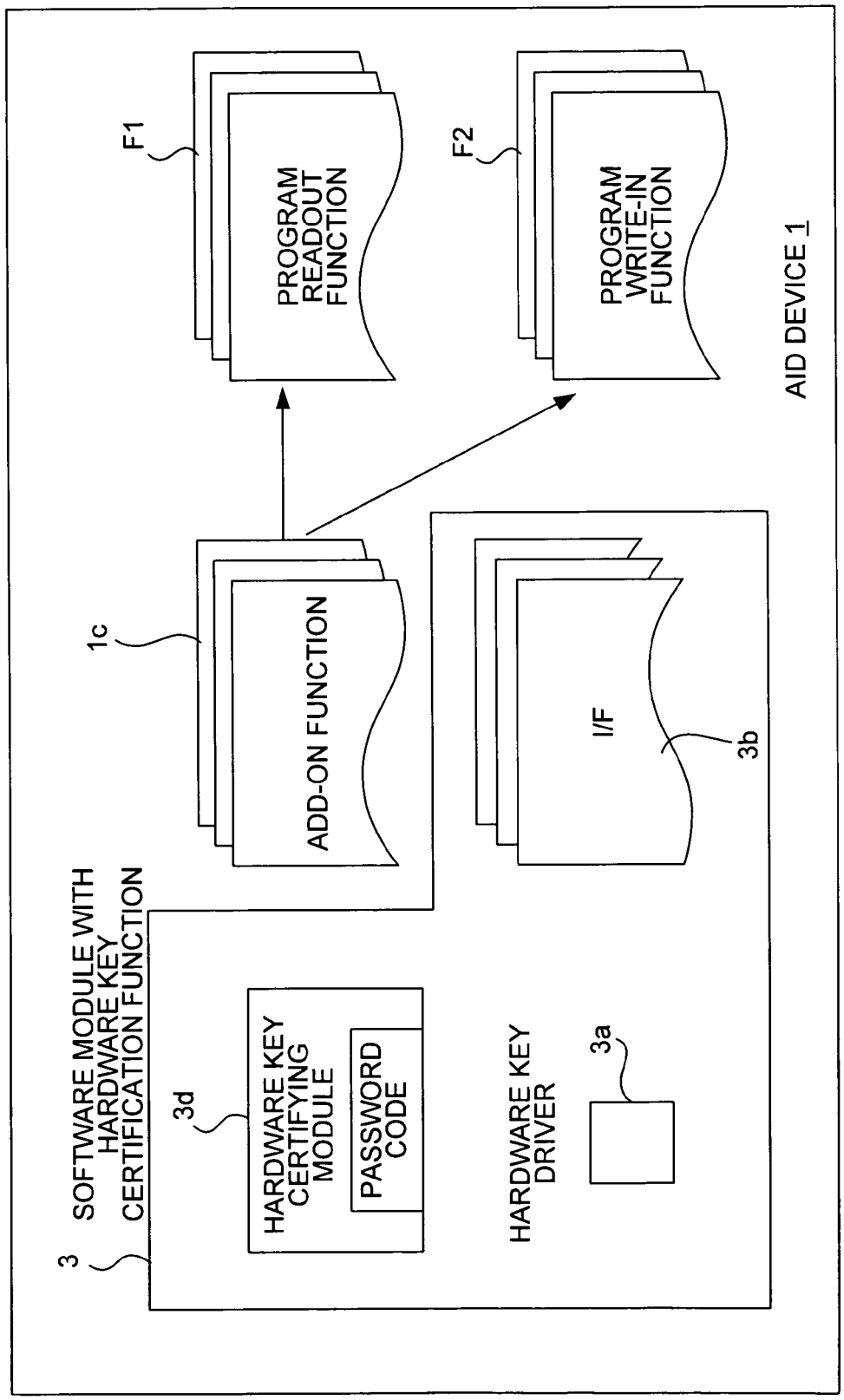
FIG. 17 is a software structural diagram of the control program development air device for the PLC of FIG. 16.

The invention has been described above by way of an example wherein the software module with an add-on function includes a portion that executes the add-on function and another portion that executes the function of certifying a hardware key. Another embodiment of the invention will be described next with reference to FIGS. 16 and 17 wherein the portion that executes the add-on function is preliminarily incorporated within the aid device program module and there exists a separate software module for executing the function of certifying a hardware key apart from the aid device program module. FIGS. 16 and 17 correspond respectively to FIGS. 1 and 2 describing the first embodiment of the invention, and like or equivalent components will be indicated by the same symbols and will not be described repetitiously.

FIG. 16 shows schematically the structure of this embodiment. Components that are like or equivalent to those shown in FIG. 1 are indicated by the same symbols and will not be described repetitiously. Thus, the PLC system of this embodiment is shown as comprising a PLC 2 and a personal computer 1a serving as an aid device 1 connected together by means of a communication means (such as RS232C). In FIG. 16, A1 indicates a password memory area and A2 indicates a user program memory area. User programs created on the aid device 1 are stored in the user program memory area A2 on the PLC 2.

An aid device program module which has a portion for executing an add-on function preliminarily incorporated and a software module having the function of certifying a hardware key are incorporated into the aid device 1. In the above, the add-on function means the same add-on function explained above and hence will not be explained again. A hardware key 11 is detachably attached to the personal computer 1a. This hardware key 11 may comprise a detachably attachable memory medium such as a flash memory (commonly referred to as a USB memory) having a case with a USB plug attachable to the USB socket of the personal computer 1a. A specified password code 11a is stored in this hardware key 11 (as shown in FIG. 3).

The software structure of the aid device 1 is shown in FIG. 17 wherein like or equivalent constituent elements are again indicated by the same symbols and will not be described repetitiously. Thus, in FIG. 17, numeral 1 indicates the aid device 1 as program module, numeral 3 indicates a software module having the function of certifying a hardware key, F1 indicates the program read-out function which is a software function, and F2 indicates the program write-in function which is also a software function. The programs which are to be read out by the program read-out function F1 are the user programs stored in the user program memory area A2 on the PLC 2. The programs which are the target of the program write-in function F2 are the user programs on the aid device 1.

As shown in FIG. 17, the software module 3 having the function of certifying a hardware key contains a hardware key driver 3a, an interface (I/F) 3b with the hardware key driver 3a and a hardware key certifying module 3d. In the above, the hardware key driver 3a, the interface (I/F) 3b with the hardware key driver 3a and the hardware key certifying module 3d are respectively the same as the hardware key driver 10a, the interface (I/F) with the hardware key driver 10a and the hardware key certifying module 10d shown in FIG. 2. The add-on function 1c which is preliminarily incorporated into the aid device program module is the same as the add-on function 10c shown in FIG. 2.

The structure of the aid device according to this embodiment is also as shown in FIG. 3. According to this embodiment, the software module with the function of certifying a hardware key is stored in the auxiliary memory device 123 and is provided onto the memory 122 in response to a startup command of the aid device program. Since the portion that executes the add-on function is preliminarily incorporated into the aid device program module, it is included in the aid device program module 122a on the memory 122 of FIG. 3.

FIG. 5 also serves as the general flowchart of the overall process by the aid device of this embodiment, except that the processes in Step 603 of FIG. 6 for describing the details of the startup process (Step 501) is different. Although Step 603 according to the first embodiment of the invention was for checking whether a software module with an add-on function exists for the personal computer, Step 603 in the present embodiment is for checking whether a software module with the function of certifying a hardware key is present in the personal computer. More specifically, it is checked whether the hardware key certifying module contained in a software module with the function of certifying a hardware key is present in the auxiliary memory device or not. In other words, if the hardware key certifying module is present, it is judged that a software module with the function of certifying a hardware key is present and if the hardware key certifying module is not present, it is judged that software module with the function of certifying a hardware key is not present.

Except for the difference explained above, the flowchart for the operation of the control program development support device of this embodiment is the same as shown in FIGS. 6-12 and it will not be repetitiously explained.

According to this invention, protect setting and releasing can be effected automatically if a hardware key and a software module for its certification are installed to the personal computer operated by an aid device in addition to a protect mechanism for a PLC unit. Thus, the merits of this invention include the following:

It should finally be noted, regarding the description of the present invention herein, that expression "communication device" is also used to indicate the communication means such as RS232C shown at 126 in FIG. 3; and that expressions "protect releasing device", "protect releasing device", "command executing device", "command creating device", and "add-on device" are also used to indicate respective functional portions (or aspects) of the CPU unit 20 and the memory 122 of the computer 1*a* as well as all the programs in the memory 122 for carrying out the processes indicated respectively at 1407 of FIG. 14, at 1409 of FIG. 14, at 1405 of FIG. 14, at 905 of FIG. 9 as well as 1005 of FIG. 10 and at 903 and 907 of FIG. 9.

(1) The password cannot be released even if a commonly known protect mechanism is analyzed and used, unless the correct password corresponding to the hardware key is used. Since there is no need for resetting after the password is released, there is no danger even if the user forgets to reset. Thus, the level of security is improved.

(2) The present invention can be used without changing the password protect mechanism of a currently existing PLC merely by adding a function to the aid device. Thus, the protect function of this invention can be realized with any PLC having the currently existing password protection mechanism.

(3) Since a PLC and an aid device of a general purpose type may be used, makers of these devices need not provide any dedicated products. Thus, this invention is advantageous to the makers from the point of view of product management and maintenance.

What is claimed is:

1. A programmable controller system comprising:
   a programmable controller having a password protect function;
   a control program development aid device comprising a personal computer having a control program development aid device program module installed therein; and
   a communication device that connects said programmable controller with said control program development aid device;
   wherein said programmable controller comprises:
   a password memory that stores a password;
   a microprocessor that executes a protect setting function for storing a protect setting condition by writing a specified password in said password memory in response to a protect setting command received through said communication device;
   a protect releasing device that stores a protect releasing condition by erasing or initializing said password stored in said password memory means in response to a password releasing command with said specified password through said communication device; and
   a command executing device that executes specified operations in response to one of operation commands that include program write-in command and program readout command if protect is released;
   wherein said control program development aid device includes:
   a command creating device that creates said operation commands in response to a specified operation; and
   an add-on device that responds to the creation of an operation command by said command creating device for automatically adding a protect releasing command and a protect setting command each with a specified unpublished password in front and behind said created operation command and to issue said commands to said programmable controller, said device being a software module different from said control program development aid device program module with a function as said control program development aid device; and
   wherein said control program development aid device program module checks at the time of startup thereof whether or not said software module with said add-on device exists in an external memory device of said personal computer, links, if said software module with said add-on device exists, said software module with said add-on device as a part of a program of said control program development aid device program module, and causes said add-on device to operate; and
   wherein said personal computer has a hardware key detachably attached thereto, said hardware key containing a memory that stores a specified password code; and
   wherein said software module with said add-on device operates on the condition of certification of said hardware key; wherein the unpublished password used by said add-on device corresponds to said specified password code in said hardware key.

2. The programmable controller system of claim 1 wherein said control program development aid device further includes:
   protect setting device that issues a communication command for setting protect in response to a specified operation; and
   protect releasing device that issues a communication command for releasing protect in response to another specified operation;
   said programmable controller system being manually operable for protect setting and protect releasing if said personal computer is not provided with said software module with said add-on device.

3. The programmable controller system of claim 1 wherein said control program development aid device further includes:
   protect setting device that issues a communication command for setting protect in response to a specified operation; and
   protect releasing device that issues a communication command for releasing protect in response to another specified operation;
   said programmable controller system being manually operable for protect setting and protect releasing if said personal computer is not provided with said software module with said add-on device.

4. A control program development aid device which is connectable to a programmable controller having password protect function through a communication device and is formed by installing a control program development aid device program module to a personal computer; said control program development aid device comprising:
   a command creating device that creates operation commands in response to a specified operation, said operation commands including program write-in command and program readout command; and
   an add-on device that responds to the creation of an operation command by said command creating device for adding a protect releasing command and a protect setting command each with a specified unpublished password in front and behind said created operation command and to issue said commands to said programmable controller, said add-on device being different from said control program development aid device program module with a function as said control module program development aid device; and wherein said control program development aid device program module checks at the time of startup thereof whether or not said software module with said add-on device exists in an external memory device of said personal computer, links, if said software module with said add-on device exists, said software module with said add-on device as a part of a program of said control program development aid device program module, and causes said add-on device to operate; and wherein said personal computer has a hardware key detachably attached thereto, said hardware key containing a memory that stores a specified password code; and wherein said software module with said add-on device operates on the condition of certification of said hardware key; wherein the unpublished password used by said add-on device corresponds to said specified password code in said hardware key.

5. The control program development aid device of claim 4 wherein said control program development aid device further includes:

protect setting device that issues a communication command for setting protect in response to a specified operation; and protect releasing device that issues a communication command for releasing protect in response to another specified operation;

said control program development aid device being manually operable for protect setting and protect releasing if said personal computer is not provided with said software module with said add-on device.

6. The control program development aid device of claim 1 wherein said control program development aid device further includes:

protect setting device that issues a communication command for setting protect in response to a specified operation; and protect releasing device that issues a communication command for releasing protect in response to another specified operation;

said control program development aid device being manually operable for protect setting and protect releasing if said personal computer is not provided with said software module with said add-on device.

7. A control program development aid device which is connectable to a programmable controller having password protect function through a communication device and is formed by installing a control program development aid device program module to a personal computer; said control program development aid device comprising:

a command creating device that creates operation commands in response to a specified operation, said operation commands including program write-in command and program readout command;

an add-on device that responds to the creation of an operation command by said command creating device for adding a protect releasing command and a protect setting command each with a specified unpublished password in front and behind said created operation command and to issue said commands to said programmable controller; and a detachably attachable hardware key containing a memory that stores a specified password code;

wherein said control program development aid device program module checks at the time of startup thereof whether or not a software module for certifying the hardware key exists in an external memory device of said personal computer, links, if said software module with said function of certifying the hardware key exists, said software module with said function of certifying the hardware key as a part of a program of said control program development aid device program module, and causes said software module for certifying the hardware key to operate; and wherein said add-on device is operated on the condition of certification of said hardware key; wherein the unpublished password used by said add-on device corresponds to said specified password code in said hardware key.

8. The control program development aid device of claim 7 wherein said control program development aid device further includes:

protect setting device that issues a communication command for setting protect in response to a specified operation; and protect releasing device that issues a communication command for releasing protect in response to another specified operation;

said control program development aid device being manually operable for protect setting and protect releasing if said personal computer is not provided with said software module for certifying the hardware key.

9. The control program development aid device of claim 7 wherein said control program development aid device further includes:

protect setting device that issues a communication command for setting protect in response to a specified operation; and protect releasing device that issues a communication command for releasing protect in response to another specified operation;

said control program development aid device being manually operable for protect setting and protect releasing if said personal computer is not provided with said software module for certifying the hardware key.

10. The programmable controller system of claim 1 wherein said protect setting command serves to improve security level by making it unnecessary for the user to reset said password after said password is released by said protect releasing command even if said user forgets to reset said password.

* * * * *